US012774193B2

(12) United States Patent
Hudlow

(10) Patent No.: US 12,774,193 B2
(45) Date of Patent: Oct. 27, 2026

(54) SYSTEM AND APPARATUS FOR LIFTING ELONGATED OBJECTS

(71) Applicant: David Hudlow, Panama City, FL (US)

(72) Inventor: David Hudlow, Panama City, FL (US)

( * ) Notice: Subject to any disclaimer, the term of this patent is extended or adjusted under 35 U.S.C. 154(b) by 1038 days.

(21) Appl. No.: 17/972,849

(22) Filed: Oct. 25, 2022

(65) Prior Publication Data

US 2024/0132329 A1 Apr. 25, 2024
US 2024/0228235 A9 Jul. 11, 2024

(51) Int. Cl.
*B66C 1/22* (2006.01)

(52) U.S. Cl.
CPC .................................... *B66C 1/22* (2013.01)

(58) Field of Classification Search
CPC .... B66C 1/22; B66C 1/26; B66C 1/34; B66C 1/105; B66C 1/62
USPC .................................. 294/67.1, 67.2, 67.21
See application file for complete search history.

(56) References Cited

U.S. PATENT DOCUMENTS 1,742,384 A * 1/1930 Fitzgerald, Jr. ........... B66C 1/26 294/63.1
3,275,367 A * 9/1966 Bopp ........................ B66C 1/24 414/550
3,600,030 A * 8/1971 Varon ....................... B66C 1/16 294/67.4
3,897,097 A * 7/1975 Davis, Jr. ................ B66C 13/08 294/81.4
3,998,488 A * 12/1976 Durgan ..................... B66C 1/10 294/67.21
4,522,544 A * 6/1985 Shah .................... B65G 49/068 414/739
4,542,928 A * 9/1985 Fowler, Jr. ................ B66C 1/16 294/81.1
4,549,759 A * 10/1985 Fowler, Jr. ................ B66C 1/24 294/81.1
4,662,669 A * 5/1987 Erickson .................. B01J 19/00 294/68.27
5,184,929 A * 2/1993 Reynolds .................. B66C 1/16 414/400
5,474,259 A * 12/1995 De Forges De Parny .................. H02G 1/02 244/137.4
10,654,545 B1 * 5/2020 Allen ........................ B66C 1/66
2025/0026615 A1 * 1/2025 Hudlow .................... B66C 1/24

* cited by examiner

*Primary Examiner* — Paul T Chin
(74) *Attorney, Agent, or Firm* — Larson & Larson; Frank Liebnow

(57) ABSTRACT

An apparatus for lifting elongated objects includes a shelf that is elongated, and a frame connected to a lengthwise edge of the shelf for lifting the shelf and any panels that are resting on the shelf. The frame includes risers affixed to the shelf and extension members that extend from the risers over the shelf. Shackles are mounted to the extension members at a location (center of gravity) that keeps the apparatus for lifting elongated objects substantially level when lifted by cables attached to the shackles. Telescoping extensions at each end of the shelf provide for lifting longer elongated objects (e.g., the shelf is 30 feet long when the telescoping extensions are retracted and 50 feet long when the telescoping extensions are completely extended, providing for lifting very long elongated objects (e.g., 100 foot long or greater elongated objects).

17 Claims, 5 Drawing Sheets

SYSTEM AND APPARATUS FOR LIFTING ELONGATED OBJECTS

FIELD

This invention relates to the field of roofing and siding and more particularly to a system for safely lifting elongated objects.

BACKGROUND

In recent years, more and more building construction uses metal panels (e.g., steel panels) for various reasons including construction speed, costs, durability, resistance to hail/storms, and aesthetics.

These panels have grown in length from 8 feet long on up to 30 feet long or longer, at times 100 feet long. The longer panel reduces construction time/costs and improves aesthetics by requiring less seams. For example, a 50-foot side of a building can be constructed using 50-foot panels without any vertical seams.

As the length of these panels increases, it becomes more difficult to lift the panels for installation on sides of buildings and roofs. In the past, a crane or other hoist was used to lift these panels from a central location, for example, wrapping a line at a midpoint of several panels and lifting the line with a crane. As panel length increases, this causes several problems. The first problem is stability. If the line is wrapped off-center. As the panels are lifted, they will skew, making it difficult to maneuver into the construction area. The second problem is bending. As the ends of these panels are distal from the lift point, gravity will pull on the ends causing bowing and given certain lengths, the panels will bend, or worse, fold over, destroying the panels and endangering construction workers.

In the past, some have tried to lift such panels using magnets (e.g., electro-magnets), typically affixing magnets at two points to help reduce bending and folding of the panels. Using magnets is better than a central cable, but the magnets must be placed in the correct locations for proper weight distribution or the panels will be damaged and safety of workers compromised. Further, magnets will not work with aluminum panels.

What is needed is a system that will safely and efficiently lift panels.

SUMMARY

An apparatus for lifting elongated objects has a shelf that is elongated, and a frame connected to a lengthwise edge of the shelf for lifting the shelf and any panels that are resting on the shelf. The frame includes risers affixed to the shelf and extension members that extend from the risers over the shelf. Shackles are mounted to the extension members at a location (center of gravity) that keeps the apparatus for lifting elongated objects substantially level when lifted by cables attached to the shackles. Telescoping extensions at each end of the shelf provide for lifting longer elongated objects (e.g., the shelf is 30 feet long when the telescoping extensions are retracted and 50 feet long when the telescoping extensions are completely extended, providing for lifting very long elongated objects (e.g., 100 foot long or greater elongated objects).

In one embodiment, an apparatus for lifting elongated objects is disclosed including a shelf for supporting the elongated objects. The shelf has an elongated length and a width that is less than four feet. There is a plurality of risers, a first end of each is affixed to a lengthwise side of the shelf. A plurality of extensions protrudes from the risers over the shelf. Each of the extensions is affixed to a second end of the risers, the second end of the risers distal from the first end of the risers. A connecting bracket is affixed to the extensions and runs parallel to the shelf. The connecting bracket has two shackles for connecting cables to the apparatus for lifting the elongated objects.

In another embodiment, a method for lifting elongated panels is disclosed including providing the apparatus for lifting the elongated objects as above, looping a cable through the two shackles, and connecting the cable to a device for lifting. One or more of the elongated panels are placed (preferably centered) on the shelf of the apparatus for the lifting elongated objects and the apparatus for lifting the elongated objects is lifted by the device for lifting.

In another embodiment, an apparatus for lifting elongated objects is disclosed including a shelf for supporting the elongated objects. The shelf comprising three shelf supports that are parallel to each other, each of the shelf supports are 4 inches by 8 inches by 30 feet long, are hollow, and are affixed to a plurality of shelf support. Each of the shelf supports are 4 inches by 8 inches by 5 feet long and are hollow and made of steel. The apparatus for lifting elongated objects also has a plurality of risers. Each of the risers are 2 inches by 2 inches by 5 feet long and a first end of each of the risers is affixed to a lengthwise side of the shelf. A plurality of extension, each being 2 inches by 2 inches by 2¼ feet long, are affixed to a second end of the risers, the second end of the risers being distal from the first end of the risers. A connecting bracket is affixed to the extensions and parallel to the shelf. The connecting bracket is made of sheet steel and has two shackles mounted thereon for connecting cables to the apparatus for lifting the elongated objects.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
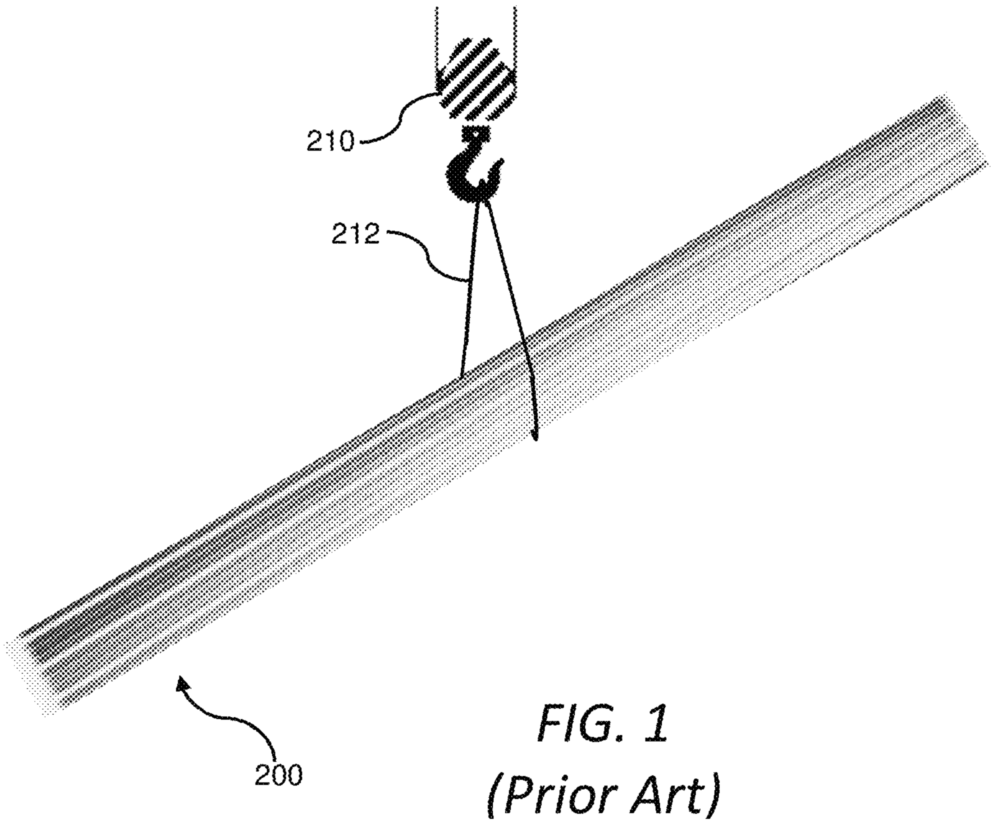
FIG. 1 (Prior Art)
FIG. 1 illustrates a perspective view of a panel being lifted by a crane as done in the prior art.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a perspective view of a panel or bundle of panels being lifted by a crane as done in the prior art is shown. For clarity and brevity reasons, only the crane block 210 is shown as cranes are well known in the art. In the past, one or more panels 200 (e.g., metal siding panels, metal roofing panels) are lifted by the crane block 210 (and crane—not shown) by a cable 212 that is wrapped around the panel(s) 200. These prior methods of lifting such panels 200 become less useful as the length of the panels 200 increase. There are several issues with these prior methods that cause problems, even for shorter-length panels. For one, if the cable 212 is not centered properly, when the panels 200 are lifted, the panels 200 skew, creating a safety issue as one or more panels can slide out of the cable and get damaged or worse yet, hurt a worker. Another problem, especially for long panels, is bowing or bending of the panels 200. Recently, there has been a shift from shorter panels to longer panels for many reasons including cost of installation and aesthetics. If a 48-foot wall is being constructed, it is faster to set and fasten one 48-foot panel than six 8-foot panels and there are no seams as is when 4-foot panels are used. Generally, the construction of the panel is not changed, only the length. For example, a typical steel panel having a thickness of 0.015 inches of grade 80 steel is available in 8-foot lengths and weighs around 35 pounds. When the same panel is made in 64-foot lengths, the thickness and ribbing remain the same and the weight increases to 240 pounds. When lifting the 8-foot panel by a cable tied at the center, there is approximately 17.5 pounds of weight on each side exerting a gravitational downward force that creates a small amount of bowing or bending. When lifting the 64-foot panel by a cable tied at the center, there is approximately 120 pounds of weight on each side exerting a more significant gravitational downward force that creates a large amount of bowing or bending, and in some cases, deforms the panel by adding curvature or destroys the panel should the panel not have sufficient ribbing to prevent folding onto itself. The situation is worse should the cable 212 not be centered properly.

Note that the following description describes details of one embodiment of an apparatus for lifting elongated objects 100 as shown in FIGS. 2-9. Alternate embodiments are fully anticipated utilizing different construction materials and components that are fastened in countless anticipated ways to meet the same or similar requirements, that being to support and lift elongated objects, for example, construction panels that are significantly long (e.g., greater than 20 feet long). Also, in the following description, it is anticipated that the construction components are generally steel sections that are welded together or fastened in any way known in the art. Also, for weight reduction or other functionality, the steel components are typically hollow, having wall thicknesses that in some embodiments are 0.188 inches thick.

Figure 2:
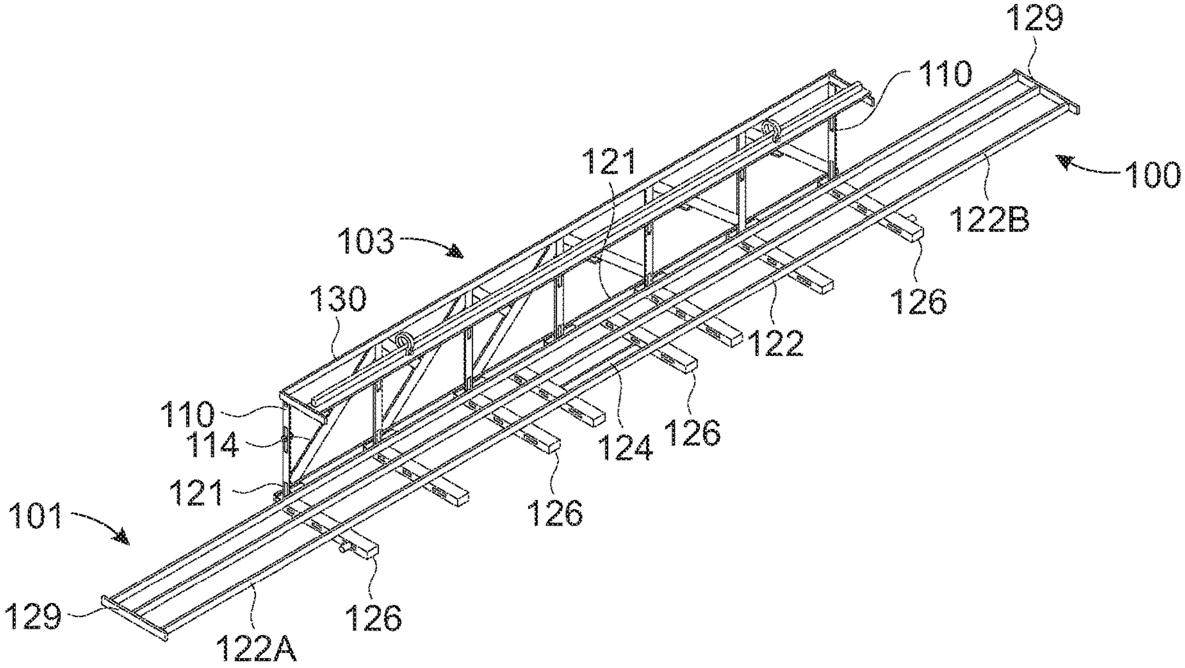
FIG. 2 illustrates a perspective view of an apparatus for lifting elongated objects such as siding panels or roofing panels.
Figure 3:
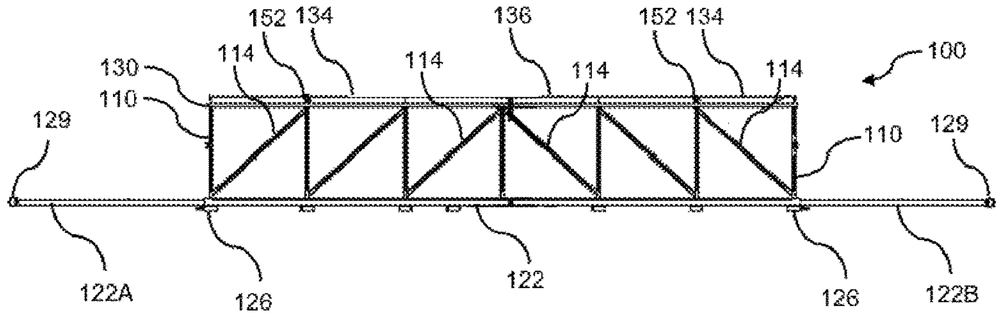
FIG. 3 illustrates a front elevational view of the apparatus for lifting elongated objects.
Figure 4:
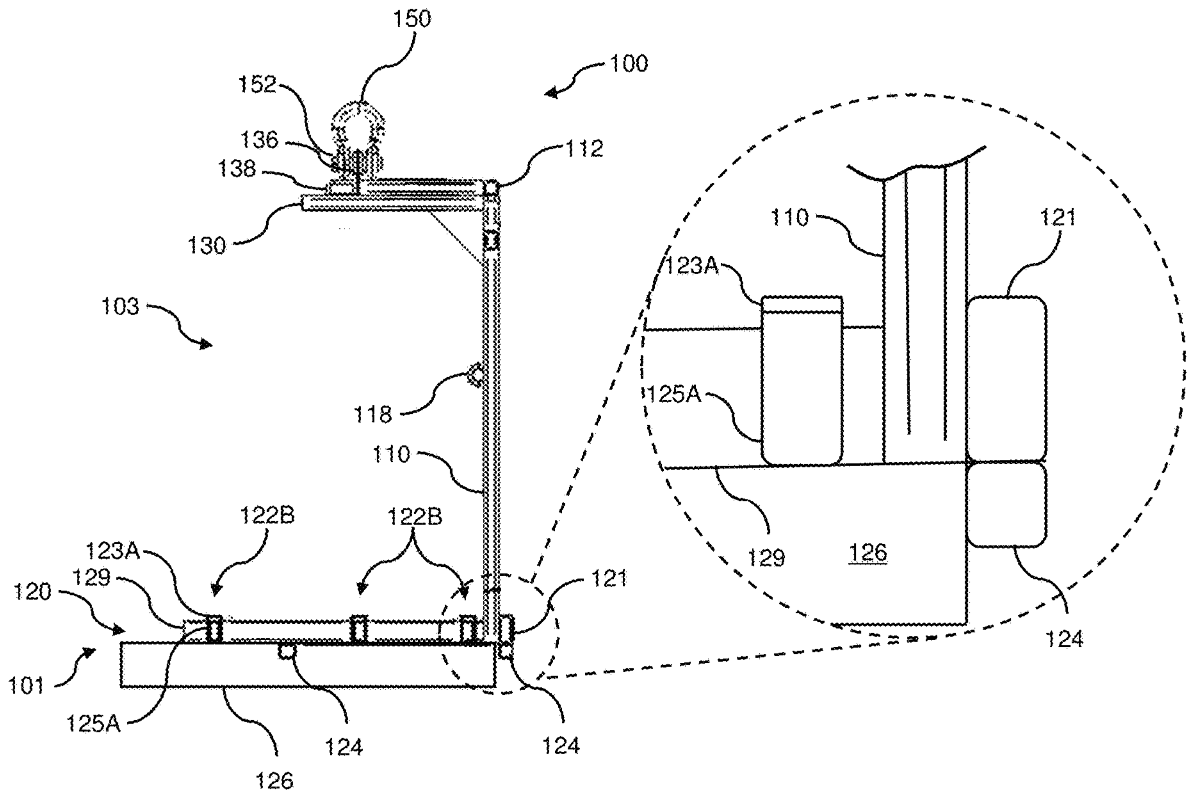
FIG. 4 illustrates a side elevational view of the apparatus for lifting elongated objects.

Referring to FIGS. 2 through 4, views of the apparatus for lifting elongated objects 100 such as siding panels or roofing panels are shown. The apparatus for lifting elongated objects 100 has a shelf 101 on which the elongated objects (e.g., panels 200) rest while being lifted by a crane. The shelf 101 is supported by a frame 103 that attaches to a cable 212 (see FIG. 5) and a crane block 210 for lifting the apparatus for lifting elongated objects 100 along with one or more panels 200 (e.g., steel, plastic, aluminum panels of long lengths). As the panels 200 rest on the shelf 101, the shelf 101 evenly supports the weight of the panels 200 and therefore limits or eliminates bending or folding of the panels. In some embodiments, the shelf 101 has a base section 122 that is long enough to support many lengths of panels 200, for example, 30-feet long. It is noted that a 30-foot shelf is sufficient in length to support panels 200 that are longer than 30-feet, for example, panels that are 60-feet long, allowing 15-feet of overhang at each end. For panels 200 that are longer, in some embodiments the shelf 101 has telescoping shelf extensions 122A/122B that retract within the base section 122 and telescope outwardly (e.g., by an additional 10 feet) for supporting panels 200 that are even longer. For example, if the shelf 101 has a base section of 30-feet and two telescoping shelf extensions 122A/122B of 10-feet each, the total length of the shelf 101 when the telescoping shelf extensions 122A/122B are extended is 50 feet, suitable for lifting most panels 200 that are 100 feet long.

The frame 103 has risers 110 and extenders 130 that position the shackles 150 at a lengthwise and depth wise center-of-gravity so that when lifting the panels 200, the shelf 101 is substantially level (e.g., when the panel width is the widest width anticipated) or slightly skewed toward the risers 110 (e.g., when the panel width is less that the widest width anticipated) such that the panels 200 will not slide off of the shelf 101.

As shown in FIG. 2, the telescoping shelf extensions 122A/122B are extended. Each telescoping shelf extensions 122A/122B has a shelf end support 129 for structural reasons and for limiting how far the telescoping shelf extensions 122A/122B telescope within the base section 122 members. The shelf 101 is supported by a plurality of shelf supports 126, for example, 4 inch by 8 inch steel members. In some embodiments, the central shelf supports 126 are spaced to match the tines of a forklift such that the apparatus for lifting elongated objects 100 is movable by a forklift (not shown) at the construction site.

As shown in FIGS. 2 through 4, between the risers 110, there are angular supports 114 that provide structural support to the frame and prevent bending under stress. Also, in some embodiments, an upper riser support 112 (e.g., a 2 inch by 2-inch steel tube) connects a top end of the risers 110. Likewise, a base stiffener 121/124 (e.g., 4 inch by 2 inch steel tube and 2 inch by 2 inch steel tube) provides added structural support to the shelf 101. The frame 103 includes extenders 130 (e.g., 2 inch by 4 inch steel tubes) extending from an end of the risers 110 in the same direction as the shelf 101. Attached to the extenders 130 are connecting brackets 136 (see FIG. 7) for connecting a cable 212 (see FIG. 5) for lifting by a crane. A shackle 150 is fastened to each connecting bracket 136 by a fastener 152 (e.g., a bolt). The location of the connecting brackets 136 is such that when lifted by the shackle 150, a planar sheet resting on the shelf 101 of the apparatus for lifting elongated objects 100 will be generally parallel to a level surface. In the embodiment shown, a front riser support 138 (e.g., 2 inch by 4 inch steel tube) runs across the top front surfaces of the extenders 130 for added strength.

In some embodiments a guide loop 118 is affixed to one or more of the risers 110 for tying a safety cable that keeps the panels 200 from falling in case the apparatus for lifting elongated objects 100 is lifted improperly or strikes and object.

In some embodiments, a triangular sheet of steel 132 is affixed (e.g., welded) into the corner between the risers 110 and the extenders 130.

In some embodiments, a stiffener tube 142 is affixed (e.g., welded) to the extenders 130 between the riser support and the bracket 134/136.

Figure 5:
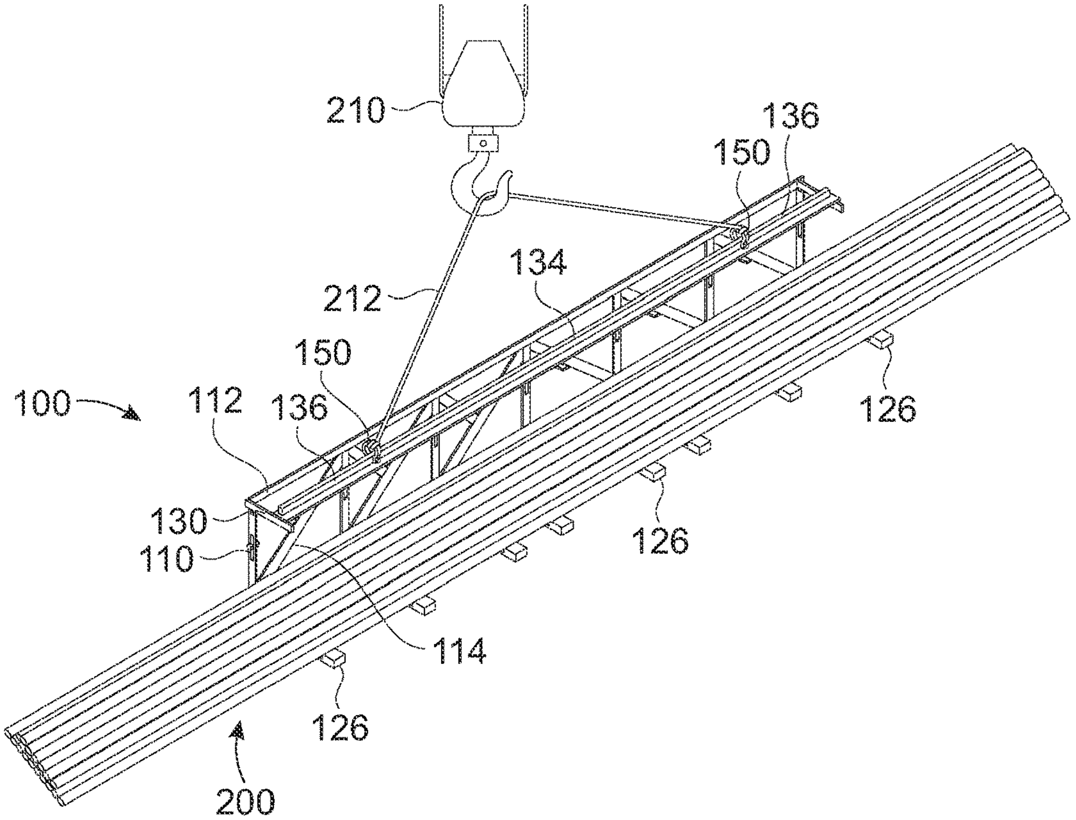
FIG. 5 illustrates a perspective view of the apparatus for lifting elongated objects in use lifting a long metal roofing or siding panels.
Figure 6:
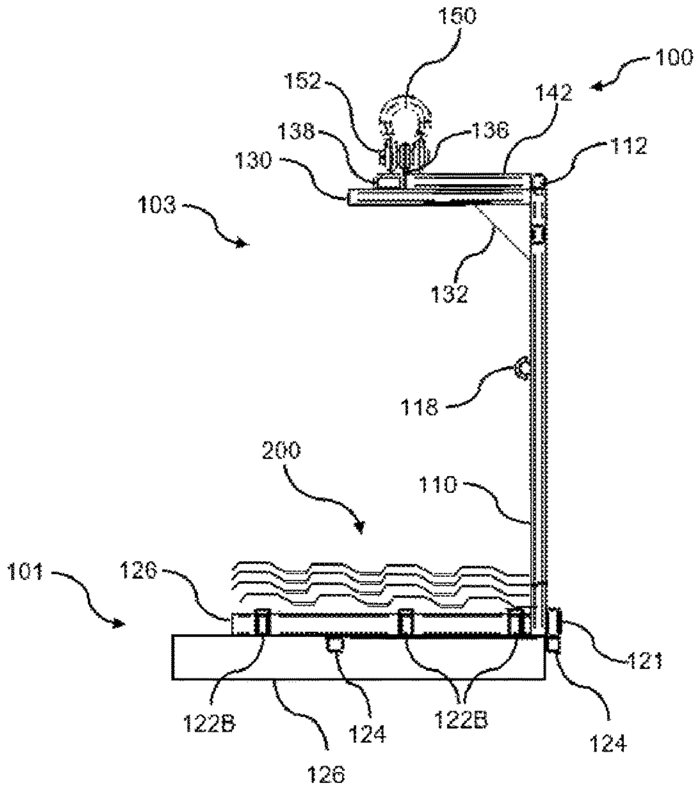
FIG. 6 illustrates the side elevational view of the apparatus for lifting elongated objects holding several metal roofing or siding panels.

Referring to FIGS. 5 and 6, views of the apparatus for lifting elongated objects 100 in use are shown lifting panels 200. The panels 200 (e.g., steel panels measuring three feet wide and up to 100 feet long) rest on the shelf 101 while the apparatus for lifting elongated objects 100 is lifted by a crane block 210 (crane not shown for brevity and clarity) that lifts the apparatus for lifting elongated objects 100 by a cable 212 that is attached to each of the shackles 150. Note that in this example, several panels 200 are stacked upon the shelf 101. Although not shown, it is anticipated that a safety cable/rope is tied around the panels and passed through the guide loops 118 to help retain the panels 200 should the apparatus for lifting elongated objects 100 be mishandled.

Figure 7:
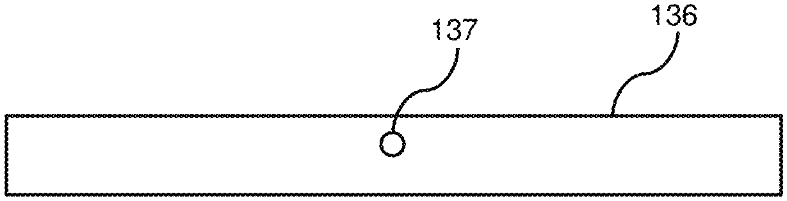
FIG. 7 illustrates a front elevational view of a connecting bracket of the apparatus for lifting elongated objects.
Figure 8:
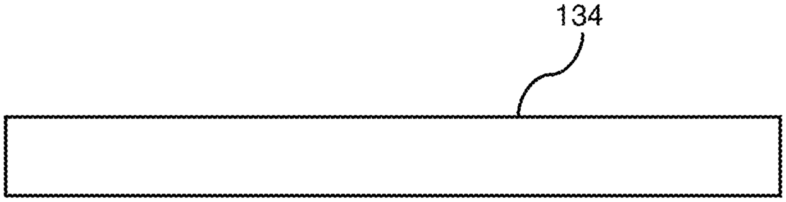
FIG. 8 illustrates a front elevational view of a bracket of the apparatus for lifting elongated objects.

Referring to FIGS. 7 and 8, elevational views of brackets 136/134 of the apparatus for lifting elongated objects 100 are shown. The connecting bracket 136 has an orifice 137 through which the shackle 150 is connected by a fastener 152 (e.g., a bolt). The bracket 134 fills the space between the connecting brackets 136, though it is equally anticipated that a single bracket 136/134 be used spanning the full set of extenders 130 and having two orifices 137.

Figure 9:
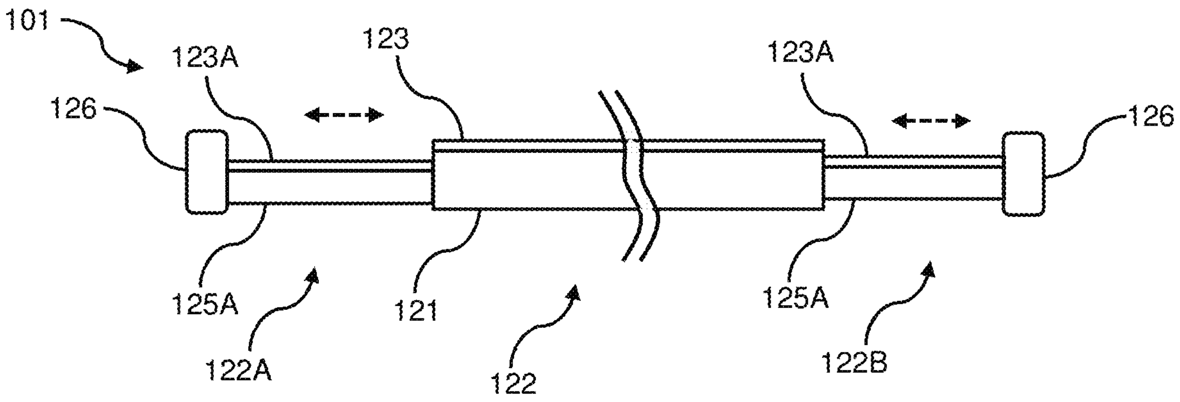
FIG. 9 illustrates a schematic view of telescoping extensions of the apparatus for lifting elongated objects.

Referring to FIG. 9, a schematic view of the telescoping shelf extensions 122A/122B of the apparatus for lifting elongated objects 100 is shown. Note that, in the embodiments shown, the telescoping shelf extensions 122A/122B are symmetrical and it is anticipated that when the telescoping shelf extensions 122A/122B are extended, each telescoping shelf extensions 122A/122B is extended by the same amount to maintain a balanced center of gravity of the apparatus for lifting elongated objects 100. Likewise, when the panels 200 are positioned on the shelf 101, it is also anticipated that the panels 200 be centered as best as possible to maintain a balanced center of gravity of the apparatus for lifting elongated objects 100.

Although, as stated prior, there are may ways to construct the apparatus for lifting elongated objects 100, the shelf 101 portion is designed to utilized existing materials while providing reliable and sturdy telescopic features. Keeping with such, the base section 122 is made using base member tubes 121 of a specific size (e.g., 2 inch by 4 inch by 30 feet steel tubes) while the telescoping shelf extensions 122A/122B are made from telescoping shelf member tubes 125A (e.g., 1½ inch by 3 inch by 13 feet steel tubes) that are slightly smaller to fit snuggly within the base member tubes 121. Note that using standard, available steel tubes, the difference in heights between the base member tubes 121 and the telescoping shelf member tubes 125A is nominally one inch. To provide added strength and reduce skewing when the telescoping shelf extensions 122A/122B are extended, telescoping shelf plates 123A (e.g., ½ inch by 1½ inch by 13-foot steel bar) are installed on each of the telescoping shelf member tubes 125A for added strength and to reduce skewing of the telescoping shelf extensions 122A/122B when they are extended. For added strength and to prevent the telescoping shelf extensions 122A/122B from getting lost within the base section 122, shelf supports 126 are affixed to ends of the telescoping shelf member tubes 125A and telescoping shelf plate 123.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. An apparatus for lifting elongated objects, the apparatus comprising:

a shelf for supporting the elongated objects, the shelf having an elongated length and a width that is less than four feet;

a plurality of risers, a first end of each of the risers affixed to a lengthwise side of the shelf;

a plurality of extension, each of the extensions affixed to a second end of the risers, the second end of the risers distal from the first end of the risers;

a connecting bracket affixed to each of the extensions and the connecting bracket spans the extensions, the connecting bracket runs parallel to the shelf, the connecting bracket has two shackles for connecting cables to the apparatus for lifting the elongated objects; and a telescoping shelf extension at each end of the shelf, the telescoping shelf extensions movable between a retracted position and an extended position.

2. The apparatus of claim 1, further comprising at least one guide loop for securing a rope or cable to for safety during lifting of the elongated objects.

3. The apparatus of claim 1, wherein the shelf is nominally 30 feet long and 3½ feet to 5 feet wide.

4. The apparatus of claim 1, wherein the shelf is nominally 30 feet long and 3½ feet wide and the telescoping shelf extensions are 3½ feet wide and each extend an additional 10 feet in the extended position.

5. The apparatus of claim 1, further comprising a plurality of shelf supports, each shelf support affixed below the shelf and is perpendicular to the elongated length of the shelf.

6. The apparatus of claim 5, wherein at least two of the plurality of shelf supports are sized and configured to accept tines of a forklift for lifting the apparatus for lifting the elongated objects by the forklift.

7. The apparatus of claim 6, wherein each shelf support of the plurality of shelf supports is 4 inches by 8 inches by 5 feet long of steel tube.

8. The apparatus of claim 1, wherein the shelf comprises three parallel steel tubes that are 2 inch by 4 inch by 30 feet long.

9. The apparatus of claim 8, wherein each of the three parallel steel tubes have a 1.5 inch by 0.5 inch by 30 foot steel plate for added strength.

10. The apparatus of claim 8, wherein each of the telescoping shelf extensions comprise three parallel extension steel tubes that are 1.5 inch by 3.5 inch by 13 feet long and each of the three parallel extension steel tubes have a steel extension plate affixed to a surface that is 1.5 inch by 0.5 inch by 13 foot for added strength, whereas a first end of each of the three parallel extension steel tubes telescope into a respective one of the three parallel steel tubes.

11. The apparatus of claim 10, wherein a shelf support is affixed to a second end of the three parallel extension steel tubes, the second end is distal from the first end.

12. A method for lifting elongated panels comprising:

providing the apparatus for lifting the elongated objects of claim 1;

looping a cable through the two shackles;

connecting the cable to a device for lifting;

placing one or more of the elongated panels on the shelf of the apparatus for lifting the elongated objects;

lifting the apparatus for lifting the elongated objects by the device for lifting; and a telescoping shelf extension at each end of the shelf, the telescoping shelf extensions movable between a retracted position and an extended position, and when the panels are over 70 feet long, moving the telescoping shelf extensions to the extended position before the step of placing the one or more of the elongated panels on the shelf.

13. The method of claim 12, wherein the device for lifting is a crane and the cables are connected to a boom of the crane.

14. The method of claim 12, wherein the apparatus for lifting the elongated objects further comprises at least one guide loop and a safety line is wrapped around the elongated panels and affixed to the at least one guide loop for safety during lifting of the elongated objects.

15. An apparatus for lifting elongated objects, the apparatus comprising:

a shelf for supporting the elongated objects, the shelf comprising three shelf members that are parallel to each other, each of the shelf members are 4 inches by 8 inches by 30 feet long, are hollow, and are affixed to shelf supports, each of the shelf supports are 4 inches by 8 inches by 5 feet long, are hollow, and are made of steel;

a plurality of risers, each of the risers are 2 inches by 2 inches by 5 feet long and a first end of each of the risers is affixed to a lengthwise side of the shelf;

a plurality of extension, each of the extensions are 2 inches by 2 inches by 2¼ feet long, each of the extensions affixed to a second end of the risers, the second end of the risers being distal from the first end of the risers;

a connecting bracket affixed to each of the extensions and the connecting bracket spans the extensions and the connecting bracket runs parallel to the shelf, the connecting bracket made of sheet steel having two shackles mounted thereon for connecting cables to the apparatus for lifting the elongated objects; and a telescoping shelf extension at each end of the shelf, each of the telescoping shelf extensions comprise three telescoping shelf members that are 1.5 inch by 3.5 inch by 13 feet long steel and each of the three telescoping shelf members have a steel extension plate affixed to a surface, the steel extension plate made of 1.5 inch by 0.5 inch by 13 foot of steel, whereas a first end of each of the three telescoping shelf members telescope into a respective one of the three shelf members, the telescoping shelf extensions movable between a retracted position and an extended position, and a shelf support made that is 1.5 inch by 3.5 inch by 5.5 feet long steel is affixed to a distal, second end of the three telescoping shelf members.

16. The apparatus of claim 15, wherein each of the extensions are affixed to the second end of the risers with a triangular metal plate.

17. The apparatus of claim 15, further comprising a plurality of cross braces risers affixed angularly between where the first end of each of the risers is affixed to the lengthwise side of the shelf and where a second end of an adjacent riser is affixed to a respective extension of the extensions.

* * * * *